US008447849B2

(12) United States Patent
Shaffer et al.

(10) Patent No.: US 8,447,849 B2
(45) Date of Patent: May 21, 2013

(54) NEGOTIATED PARENT JOINING IN DIRECTED ACYCLIC GRAPHS (DAGS)

(75) Inventors: Shmuel Shaffer, Palo Alto, CA (US); Jean-Philippe Vasseur, Saint Martin d'Uriage (FR); Sandeep Jay Shetty, San Jose, CA (US)

(73) Assignee: Cisco Technology, Inc., San Jose, CA (US)

( * ) Notice: Subject to any disclaimer, the term of this patent is extended or adjusted under 35 U.S.C. 154(b) by 366 days.

(21) Appl. No.: 12/942,949

(22) Filed: Nov. 9, 2010

(65) Prior Publication Data

US 2012/0117213 A1 May 10, 2012

(51) Int. Cl.
*G06F 15/173* (2006.01)
(52) U.S. Cl.
USPC .......................................... 709/223; 709/224
(58) Field of Classification Search
USPC ................................................. 709/223, 224
See application file for complete search history.

(56) References Cited

U.S. PATENT DOCUMENTS

| | | | |
|---|---|---|---|
| 5,317,734 A * | 5/1994 | Gupta ........................... 717/161 |
| 7,010,542 B2 * | 3/2006 | Trappen et al. ....................... 1/1 |
| 7,096,216 B2 * | 8/2006 | Anonsen ........................ 707/781 |
| 7,136,873 B2 * | 11/2006 | Smith et al. ........................... 1/1 |
| 7,149,733 B2 * | 12/2006 | Lin et al. .............................. 1/1 |
| 7,162,469 B2 * | 1/2007 | Anonsen et al. ..................... 1/1 |
| 7,171,491 B1 | 1/2007 | O'Toole et al. |
| 7,257,628 B2 | 8/2007 | Liskov et al. |
| 7,289,441 B1 | 10/2007 | Barach |
| 7,333,501 B2 | 2/2008 | Cook et al. |
| 7,359,912 B2 * | 4/2008 | Trappen et al. ....................... 1/1 |
| 7,362,776 B2 | 4/2008 | Meier et al. |
| 7,376,668 B2 * | 5/2008 | Smith et al. ........................... 1/1 |
| 7,457,261 B2 | 11/2008 | Theobold et al. |
| 7,478,087 B2 * | 1/2009 | Lin et al. .............................. 1/1 |
| 7,516,240 B2 | 4/2009 | Liskov et al. |
| 7,580,417 B2 | 8/2009 | Ervin et al. |
| 7,596,475 B2 * | 9/2009 | Thiesson et al. .................. 703/2 |
| 7,606,916 B1 | 10/2009 | Potter et al. |
| 7,613,128 B2 | 11/2009 | Castagnoli et al. |
| 7,613,134 B2 | 11/2009 | Rangarajan et al. |

(Continued)

OTHER PUBLICATIONS

Winter, et al., Internet Engineering Task Force (IETF) Internet Draft, entitled "RPL: IPv6 Routing Protocol for Low Power and Lossy Networks" <draft-ietf-roll-rpl-14>, Oct. 25, 2010.

(Continued)

*Primary Examiner* — Brian P Whipple
(74) *Attorney, Agent, or Firm* — Edward Wildman Palmer LLP; James M. Behmke

(57) ABSTRACT

In one embodiment, a node may request to join a parent node in a directed acyclic graph (DAG) in a computer network, and may notify the parent node of a load associated with the request, and whether the node has any other parent node options. The response received from the parent node may be either an acceptance or a denial (based on the load and other parent node options), where in the case of an acceptance, the node may join the parent node in the DAG. Alternatively, in response to a denial, in one embodiment, the node may perform load shedding to become acceptable to the parent node. In another embodiment, a node receiving a join request from a child node may determine an impact associated with allowing the child node (and its load) to join the receiving node in the DAG prior to returning an acceptance or denial, accordingly.

22 Claims, 13 Drawing Sheets

U.S. PATENT DOCUMENTS

| | | | |
|---|---|---|---|
| 7,693,064 | B2 | 4/2010 | Thubert et al. |
| 7,805,517 | B2 | 9/2010 | Shim et al. |
| 8,051,164 | B2* | 11/2011 | De Peuter et al. ............ 709/224 |
| 8,301,755 | B2* | 10/2012 | De Peuter et al. ............ 709/224 |
| 2004/0024807 | A1* | 2/2004 | Cabrera et al. ................ 709/201 |
| 2006/0159095 | A1 | 7/2006 | Cook et al. |
| 2008/0010043 | A1* | 1/2008 | Thiesson et al. .................. 703/2 |
| 2008/0317053 | A1 | 12/2008 | Panda et al. |
| 2009/0016292 | A1 | 1/2009 | Viswanath et al. |
| 2009/0274047 | A1 | 11/2009 | Kruys et al. |
| 2010/0011016 | A1* | 1/2010 | Greene ........................ 707/102 |
| 2010/0262684 | A1* | 10/2010 | Valois et al. ................. 709/223 |
| 2011/0231573 | A1* | 9/2011 | Vasseur et al. ............... 709/238 |
| 2012/0113807 | A1* | 5/2012 | Vasseur et al. ............... 370/230 |

OTHER PUBLICATIONS

Vasseur, et al., Internet Engineering Task Force (IETF) Internet Draft, entitled "Routing Metrics used for Path Calculation in Low Power and Lossy Networks" <draft-ietf-roll-routing-metrics-11>, Oct. 23, 2010.

Thubert, Internet Engineering Task Force (IETF) Internet Draft, entitled "RPL Objective Function 0" <draft-ietf-roll-of0-03>, Jul. 29, 2010.

Vasseur et al., New U.S. Patent Application entitled "Negotiated Parent Joining in Directed Acyclic Graphs (DAGS) Through Load Partitioning", filed Nov. 9, 2010, 44 pages.

* cited by examiner

NEGOTIATED PARENT JOINING IN DIRECTED ACYCLIC GRAPHS (DAGS)

RELATED APPLICATION

The present disclosure is related to commonly-owned, U.S. patent application Ser. No. 12/942,954 filed Nov. 9, 2010, entitled "AFFECTING NODE ASSOCIATION THROUGH LOAD PARTITIONING," now U.S. Pat. No. 8,406,153 issued Mar. 26, 2013, by Vasseur et al.

TECHNICAL FIELD

The present disclosure relates generally to computer networks, and, more particularly, to directed acyclic graph (DAG) routing and management, e.g., for Low power and Lossy Networks (LLNs).

BACKGROUND

Low power and Lossy Networks (LLNs), e.g., sensor networks, have a myriad of applications, such as Smart Grid and Smart Cities. Various challenges are presented with LLNs, such as lossy links, low bandwidth, battery operation, low memory and/or processing capability, etc. One example routing solution to LLN challenges is a protocol called Routing Protocol for LLNs or "RPL," which is a distance vector routing protocol that builds a Destination Oriented Directed Acyclic Graph (DODAG, or simply DAG) in addition to a set of features to bound the control traffic, support local (and slow) repair, etc. The RPL architecture provides a flexible method by which each node performs DODAG discovery, construction, and maintenance.

Currently, when a node wishes to join a DAG, it may do so without requiring permission from another node chosen as the entry point into the DAG. That is, the "child" nodes adopt their "parent" nodes without any input from the parent. Though this may not generally cause a problem, when the child node brings a heavy load with it (e.g., 1000 children of its own, or very high traffic volumes, etc.), this autonomy can result in over-subscription and network congestion. For example, assume that a node N has two options for parent nodes, namely P1 and P2. At first, P1 may be selected, such that node N directs orders of its own children with it to the DAG through P1. If node N has children whose orders aggregate with high capacity, direction of this traffic by node N to P1 may cause P1 to become congested, yielding an increase in congestion-related collisions and other congestion-related problems. In fact, once the selection is effected and traffic is routed by node N to P1, P2 may appear to present an improvement relative to P1, causing node N to reassess and to potentially decide to change from P1 to P2. Assuming a switch to P2, the corresponding transition of orders that come with node N may then cause P2 to become congested, and the fact that P1 is relieved of the node N load would then cause P1 to appear to present an improvement relative to P2, potentially leading to a further transition back to P1. Left unchecked, repetition of this phenomenon might continue, resulting in node N traffic flip/flopping between P1 and P2, yielding network instability in addition to undue congestion.

BRIEF DESCRIPTION OF THE DRAWINGS

The embodiments herein may be better understood by referring to the following description in conjunction with the accompanying drawings in which like reference numerals indicate identically or functionally similar elements, of which.

DESCRIPTION OF EXAMPLE EMBODIMENTS

Overview

Figure 1:
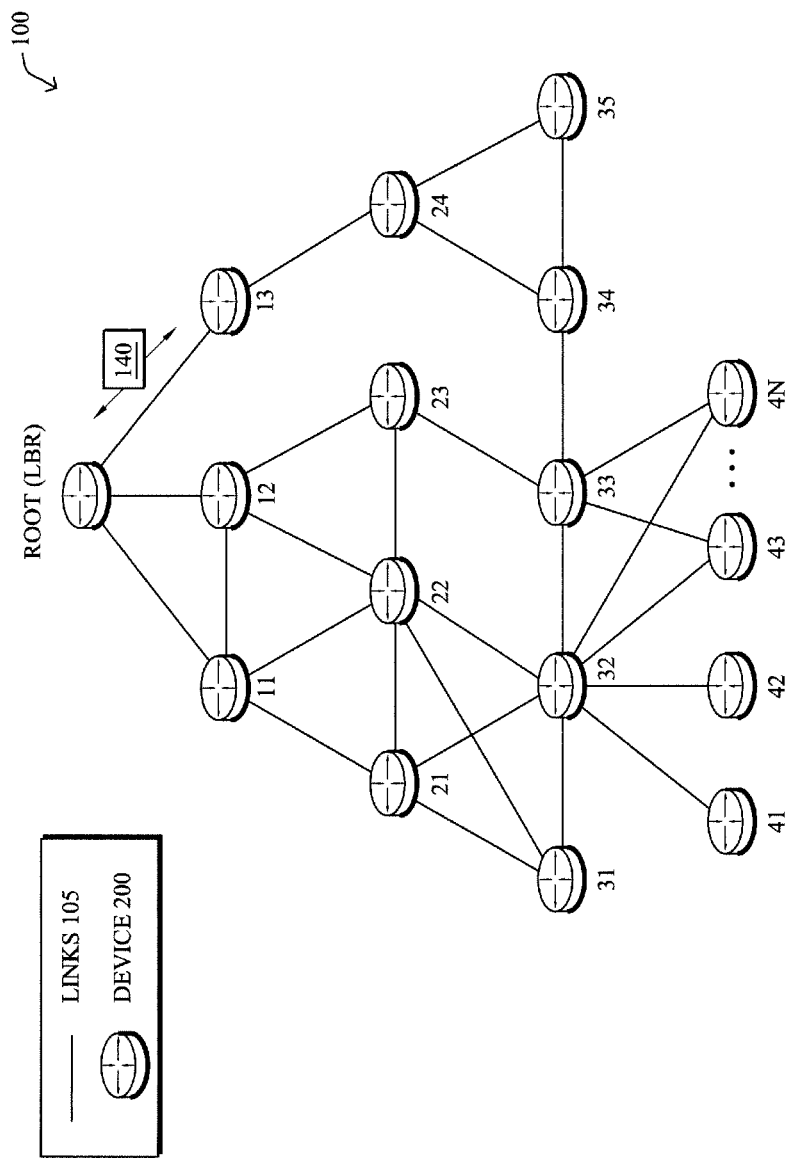
FIG. 1 illustrates an example computer network.

According to one or more embodiments of the disclosure, a node may request to join a parent node in a directed acyclic graph (DAG) in a computer network, and may also notify the parent node of a load associated with the request, and whether the node has any other parent node options. The response received from the parent node may be either an acceptance or a denial (based on the load and other parent node options), where in the case of an acceptance, the node may join the parent node in the DAG. Alternatively, in response to a denial, in one or more embodiments, the node may perform load shedding to become acceptable to the parent node.

According to one or more additional embodiments of the disclosure, a node may receive a join request from a child node, along with notification of a load associated with the request and whether the child node has any other parent node options. Based on determining an impact associated with allowing the child node (and its load or when available, load information of link on its path to the DAG root) to join the node in the DAG, the node may transmit an acceptance response if the impact is below a threshold level, or, alternatively, may transmit a denial response if the impact is above the threshold level. Additionally, in one or more embodiments, a denial response may include a request for the child node to shed some of its load before being allowed to join the prospective parent and use it as a path towards the root node.

DESCRIPTION

A computer network is a geographically distributed collection of nodes interconnected by communication links and segments for transporting data between end nodes, such as personal computers and workstations, or other devices, such as sensors, etc. Many types of networks are available, with the types ranging from local area networks (LANs) to wide area networks (WANs). LANs typically connect the nodes over dedicated private communications links located in the same general physical location, such as a building or campus. WANs, on the other hand, typically connect geographically dispersed nodes over long-distance communications links, such as common carrier telephone lines, optical lightpaths, synchronous optical networks (SONET), synchronous digital hierarchy (SDH) links, or Powerline Communications (PLC) such as IEEE 61334, CPL G3, WPC and others. In addition, a Mobile Ad-Hoc Network (MANET) is a kind of wireless ad-hoc network, which is generally considered a self-configuring network of mobile routes (and associated hosts) connected by wireless links, the union of which forms an arbitrary topology.

Smart object networks, such as sensor networks, in particular, are a specific type of network having spatially distributed autonomous devices such as sensors, actuators, etc., that cooperatively monitor physical or environmental conditions at different locations, such as, e.g., energy/power consumption, resource consumption (e.g., water/gas/etc.) temperature, pressure, vibration, sound, radiation, motion, pollutants, etc. Other types of smart objects include actuators, e.g., responsible for turning on/off an engine or perform any other actions. Sensor networks, a type of smart object network, are typically wireless networks, though wired connections are also available. That is, in addition to one or more sensors, each sensor device (node) in a sensor network may generally be equipped with a radio transceiver or other communication port, a microcontroller, and an energy source, such as a battery. Generally, size and cost constraints on sensor nodes result in corresponding constraints on resources such as energy, memory, computational speed and bandwidth. Correspondingly, a reactive routing protocol may, though need not, be used in place of a proactive routing protocol for sensor networks.

In certain configurations, the sensors in a sensor network transmit their data, along with routing/relaying data from other sensors, to one or more centralized or distributed database management nodes that obtain the data for use with one or more associated applications. Alternatively (or in addition), certain sensor networks provide for mechanisms by which an interested subscriber (e.g., "sink") may specifically request data from devices in the network. In a "push mode," the sensors transmit their data to the sensor sink/subscriber without prompting, e.g., at a regular interval/frequency or in response to external triggers, such as alarm messages. Conversely, in a "pull mode," the sensor sink may specifically request that the sensors (e.g., specific sensors or all sensors) transmit their current data (or take a measurement, and transmit that result) to the sensor sink. (Those skilled in the art will appreciate the benefits and shortcomings of each mode, and both apply to the techniques described herein.)

FIG. 1 is a schematic block diagram of an example computer network 100 illustratively comprising nodes/devices 200 (e.g., labeled as shown, "Root," "11," "12," . . . "44," "4N") interconnected by various methods of communication. For instance, the links 105 may be wired links or may comprise a wireless communication medium, where certain nodes 200, such as, e.g., routers, sensors, computers, etc., may be in communication with other nodes 200, e.g., based on distance, signal strength, current operational status, location, etc. Those skilled in the art will understand that any number of nodes, devices, links, etc. may be used in the computer network, and that the view shown herein is for simplicity. Also, while the embodiments are shown herein with reference to a generally "tree" shaped network, the description herein is not so limited, and may be applied to networks that have branches emitting to all directions from with the root node generally centralized among a plurality of surrounding nodes Illustratively, certain devices in the network may be more capable than others, such as those devices having larger memories, sustainable non-battery power supplies, etc., versus those devices having minimal memory, battery power, etc. For instance certain devices 200 may have no or limited memory capability. Also, one or more of the devices 200 may be considered "root nodes/devices" (or root capable devices), also referred to as LLN border routers (LBRs), while one or more of the devices may also be considered "destination nodes/devices."

Data packets 140 (e.g., traffic and/or messages sent between the devices/nodes) may be exchanged among the nodes/devices of the computer network 100 using predefined network communication protocols such as the Transmission Control Protocol/Internet Protocol (TCP/IP), User Datagram Protocol (UDP), Multi-Protocol Label Switching (MPLS), various proprietary protocols, etc. In this context, a protocol consists of a set of rules defining how the nodes interact with each other. In addition, packets within the network 100 may be transmitted in a different manner depending upon device capabilities, such as source routed packets.

Figure 2:
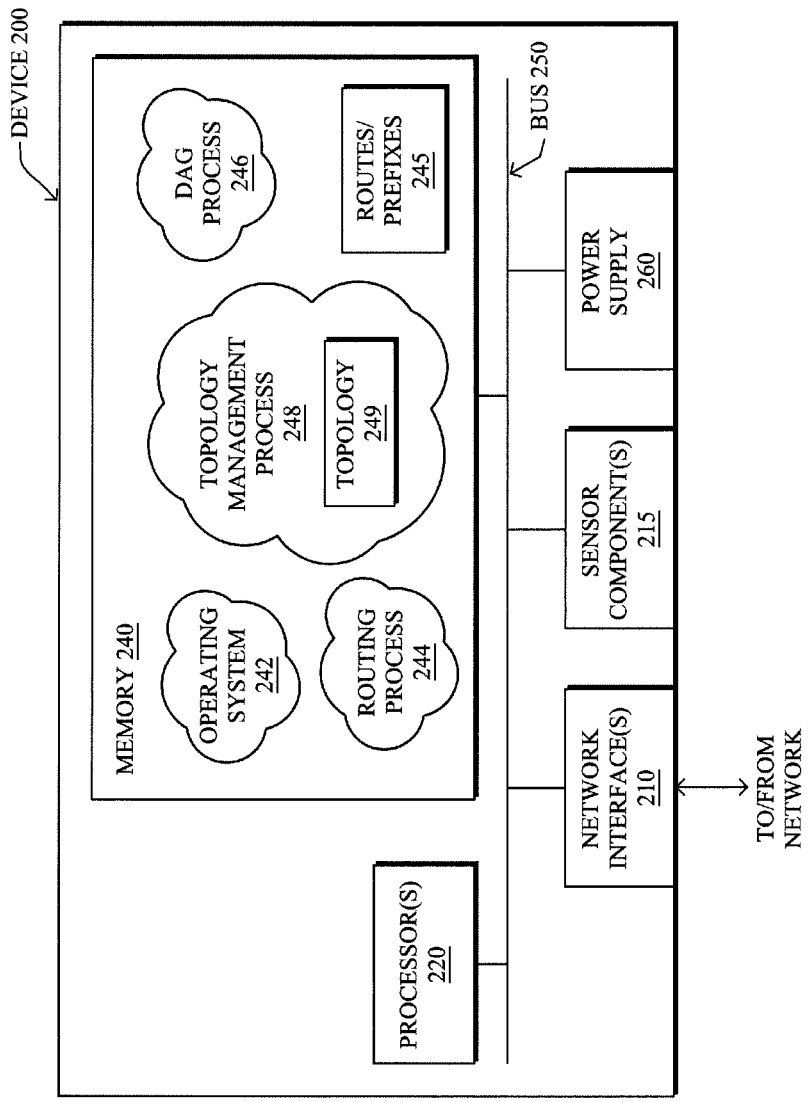
FIG. 2 illustrates an example network device/node.

FIG. 2 is a schematic block diagram of an example node/device 200 that may be used with one or more embodiments described herein, e.g., as a root node or other node (e.g., sensor) in the network. The device may comprise one or more network interfaces 210, one or more sensor components 215 (e.g., sensors, actuators, etc.), a processor 220 (e.g., an 8-64 bit microcontroller), and a memory 240 interconnected by a system bus 250, as well as a power supply 260 (e.g., battery, plug-in, etc.).

The network interface(s) 210 contain the mechanical, electrical, and signaling circuitry for communicating data over physical and/or wireless links coupled to the network 100. The network interfaces may be configured to transmit and/or receive data using a variety of different communication protocols, including, inter alia, TCP/IP, UDP, wireless protocols (e.g., IEEE Std. 802.15.4, WiFi, Bluetooth®), Ethernet, powerline communication (PLC) protocols, etc. Note that the root may have two different types of network connections 210. Namely, one or more interfaces may be used to communicate with the mesh network (into the mesh cell), i.e., the other nodes shown in FIG. 1, while another interface is used as a WAN uplink network interface between the root node and, for example, a head-end device located through the WAN.

The memory 240 comprises a plurality of storage locations that are addressable by the processor(s) 220 and the network interfaces 210 for storing software programs and data structures associated with the embodiments described herein. As noted above, certain devices may have limited memory or no memory (e.g., no memory for storage other than for programs/processes operating on the device). The processors 220 may comprise necessary elements or logic adapted to execute the software programs and manipulate the data structures, such as routes or prefixes 245 (notably on capable devices only). An operating system 242, portions of which are typically resident in memory 240 and executed by the processor(s), functionally organizes the device by, inter alia, invoking operations in support of software processes and/or services executing on the device. These software processes and/or services may comprise routing process/services 244, which may include an illustrative directed acyclic graph (DAG) process 246. Also, for root devices (or other management devices), a topology management process 248 and associated stored topologies 249 may also be present in memory 240, for use as described herein. It will be apparent to those skilled in the art that other processor and memory types, including various computer-readable media, may be used to store and execute program instructions pertaining to the techniques described herein. Also, while the description illustrates various processes, it is expressly contemplated that various processes may be embodied as modules configured to operate in accordance with the techniques herein (e.g., according to the functionality of a similar process).

Routing process (services) 244 contains computer executable instructions executed by the processor 220 to perform functions provided by one or more routing protocols, such as proactive or reactive routing protocols as will be understood by those skilled in the art. These functions may, on capable devices, be configured to manage a routing/forwarding table 245 containing, e.g., data used to make routing/forwarding decisions. In particular, in proactive routing, connectivity is discovered and known prior to computing routes to any destination in the network, e.g., link state routing such as Open Shortest Path First (OSPF), or Intermediate-System-to-Intermediate-System (ISIS), or Optimized Link State Routing (OLSR). Reactive routing, on the other hand, discovers neighbors (i.e., does not have an a priori knowledge of network topology), and in response to a needed route to a destination, sends a route request into the network to determine which neighboring node may be used to reach the desired destination. Example reactive routing protocols may comprise Ad-hoc On-demand Distance Vector (AODV), Dynamic Source Routing (DSR), DYnamic MANET On-demand Routing (DYMO), etc. Notably, on devices not capable or configured to store routing entries, routing process 244 may consist solely of providing mechanisms necessary for source routing techniques. That is, for source routing, other devices in the network can tell the less capable devices exactly where to send the packets, and the less capable devices simply forward the packets as directed.

Low power and Lossy Networks (LLNs), e.g., certain sensor networks, may be used in a myriad of applications such as for "Smart Grid" and "Smart Cities." A number of challenges in LLNs have been presented, such as:

1) Links are generally lossy, such that a Packet Delivery Rate/Ratio (PDR) can dramatically vary due to various sources of interferences, e.g., considerably affecting the bit error rate (BER);

2) Links are generally low bandwidth, such that control plane traffic must generally be bounded and negligible compared to the low rate data traffic;

3) There are a number of use cases that require specifying a set of link and node metrics, some of them being dynamic, thus requiring specific smoothing functions to avoid routing instability, considerably draining bandwidth and energy;

4) Constraint-routing may be required by some applications, e.g., to establish routing paths that will avoid non-encrypted links, nodes running low on energy, etc.;

5) Scale of the networks may become very large, e.g., on the order of several thousands to millions of nodes; and 6) Nodes may be constrained with a low memory, a reduced processing capability, a low power supply (e.g., battery).

In other words, LLNs are a class of network in which both the routers and their interconnect are constrained: LLN routers typically operate with constraints, e.g., processing power, memory, and/or energy (battery), and their interconnects are characterized by, illustratively, high loss rates, low data rates, and/or instability. LLNs are comprised of anything from a few dozen and up to thousands or even millions of LLN routers, and support point-to-point traffic (between devices inside the LLN), point-to-multipoint traffic (from a central control point to a subset of devices inside the LLN) and multipoint-to-point traffic (from devices inside the LLN towards a central control point).

An example protocol specified in an Internet Engineering Task Force (IETF) Internet Draft, entitled "RPL: IPv6 Routing Protocol for Low Power and Lossy Networks"<draft-ietf-roll-rpl-14> by Winter, at al. (Oct. 25, 2010 version), provides a mechanism that supports multipoint-to-point (MP2P) traffic from devices inside the LLN towards a central control point (e.g., LLN Border Routers (LBRs) or "root nodes/devices" generally), as well as point-to-multipoint (P2MP) traffic from the central control point to the devices inside the LLN (and also point-to-point, or "P2P" traffic). RPL (pronounced "ripple") may generally be described as a distance vector routing protocol that builds a Directed Acyclic Graph (DAG) for use in routing traffic/packets 140, in addition to defining a set of features to bound the control traffic, support repair, etc.

A DAG is a directed graph having the property that all edges are oriented in such a way that no cycles (loops) are supposed to exist. All edges are contained in paths oriented toward and terminating at one or more root nodes (e.g., "clusterheads or "sinks"), often to interconnect the devices of the DAG with a larger infrastructure, such as the Internet, a wide area network, or other domain. In addition, a Destination Oriented DAG (DODAG) is a DAG rooted at a single destination, i.e., at a single DAG root with no outgoing edges. A "parent" of a particular node within a DAG is an immediate successor of the particular node on a path towards the DAG root, such that the parent has a lower "rank" than the particular node itself, where the rank of a node identifies the node's position with respect to a DAG root (e.g., the farther away a node is from a root, the higher is the rank of that node). Further, a sibling of a node within a DAG may be defined as any neighboring node which is located at the same rank within a DAG. Note that siblings do not necessarily share a common parent, and routes between siblings are generally not part of a DAG since there is no forward progress (their rank is the same). Note also that a tree is a kind of DAG, where each device/node in the DAG generally has one parent or one preferred parent.

DAGs may generally be built based on an Objective Function (OF). The role of the Objective Function is generally to specify rules on how to build the DAG (e.g. number of parents, backup parents, etc.).

In addition, one or more metrics/constraints may be advertised by the routing protocol to optimize the DAG against. Also, the routing protocol allows for including an optional set of constraints to compute a constrained path, such as where if a link or a node does not satisfy a required constraint, it is "pruned" from the candidate list when computing the best path. (Alternatively, the constraints and metrics may be separated from the OF.) Additionally, the routing protocol may include a "goal" that defines a host or set of hosts, such as a host serving as a data collection point, or a gateway providing connectivity to an external infrastructure, where a DAG's primary objective is to have the devices within the DAG be able to reach the goal. In the case where a node is unable to comply with an objective function or does not understand or support the advertised metric, it may be configured to join a DAG as a leaf node. As used herein, the various metrics, constraints, policies, etc., are considered "DAG parameters."

Illustratively, example metrics used to select paths (e.g., preferred parents) may comprise cost, delay, latency, bandwidth, estimated transmission count (ETX), etc., while example constraints that may be placed on the route selection may comprise various reliability thresholds, restrictions on battery operation, multipath diversity, bandwidth requirements, transmission types (e.g., wired, wireless, etc.). The OF may provide rules defining the load balancing requirements, such as a number of selected parents (e.g., single parent trees or multi-parent DAGs). Notably, an example for how routing metrics and constraints may be obtained may be found in an IETF Internet Draft, entitled "Routing Metrics used for Path Calculation in Low Power and Lossy Networks"<draft-ietf-roll-routing-metrics-11> by Vasseur, et al. (Oct. 23, 2010 version). Further, an example OF (e.g., a default OF) may be found in an IETF Internet Draft, entitled "RPL Objective Function 0"<draft-ietf-roll-of0-03> by Thubert (Jul. 29, 2010 version).

Building a DAG may utilize a discovery mechanism to build a logical representation of the network, and route dissemination to establish state within the network so that routers know how to forward packets toward their ultimate destination. Note that a "router" refers to a device that can forward as well as generate traffic, while a "host" refers to a device that can generate but does not forward traffic. Also, a "leaf" may be used to generally describe a non-router that is connected to a DAG by one or more routers, but cannot itself forward traffic received on the DAG to another router on the DAG. Control messages may be transmitted among the devices within the network for discovery and route dissemination when building a DAG.

According to the illustrative RPL protocol, a DODAG Information Object (DIO) is a type of DAG discovery message that carries information that allows a node to discover a RPL Instance, learn its configuration parameters, select a DODAG parent set, and maintain the upward routing topology. In addition, a Destination Advertisement Object (DAO) is a type of DAG discovery reply message that conveys destination information upwards along the DODAG so that a DODAG root (and other intermediate nodes) can provision downward routes. A DAO message includes prefix information to identify destinations, a capability to record routes in support of source routing, and information to determine the freshness of a particular advertisement. Notably, "upward" or "up" paths are routes that lead in the direction from leaf nodes towards DAG roots, e.g., following the orientation of the edges within the DAG. Conversely, "downward" or "down" paths are routes that lead in the direction from DAG roots towards leaf nodes, e.g., generally going in the opposite direction to the upward messages within the DAG.

Generally, a DAG discovery request (e.g., DIO) message is transmitted from the root device(s) of the DAG downward toward the leaves, informing each successive receiving device how to reach the root device (that is, from where the request is received is generally the direction of the root). Accordingly, a DAG is created in the upward direction toward the root device. The DAG discovery reply (e.g., DAO) may then be returned from the leaves to the root device(s) (unless unnecessary, such as for UP flows only), informing each successive receiving device in the other direction how to reach the leaves for downward routes. Nodes that are capable of maintaining routing state may aggregate routes from DAO messages that they receive before transmitting a DAO message. Nodes that are not capable of maintaining routing state, however, may attach a next-hop parent address. The DAO message is then sent directly to the DODAG root that can in turn build the topology and locally compute downward routes to all nodes in the DODAG. Such nodes are then reachable using source routing techniques over regions of the DAG that are incapable of storing downward routing state.

Figure 3:
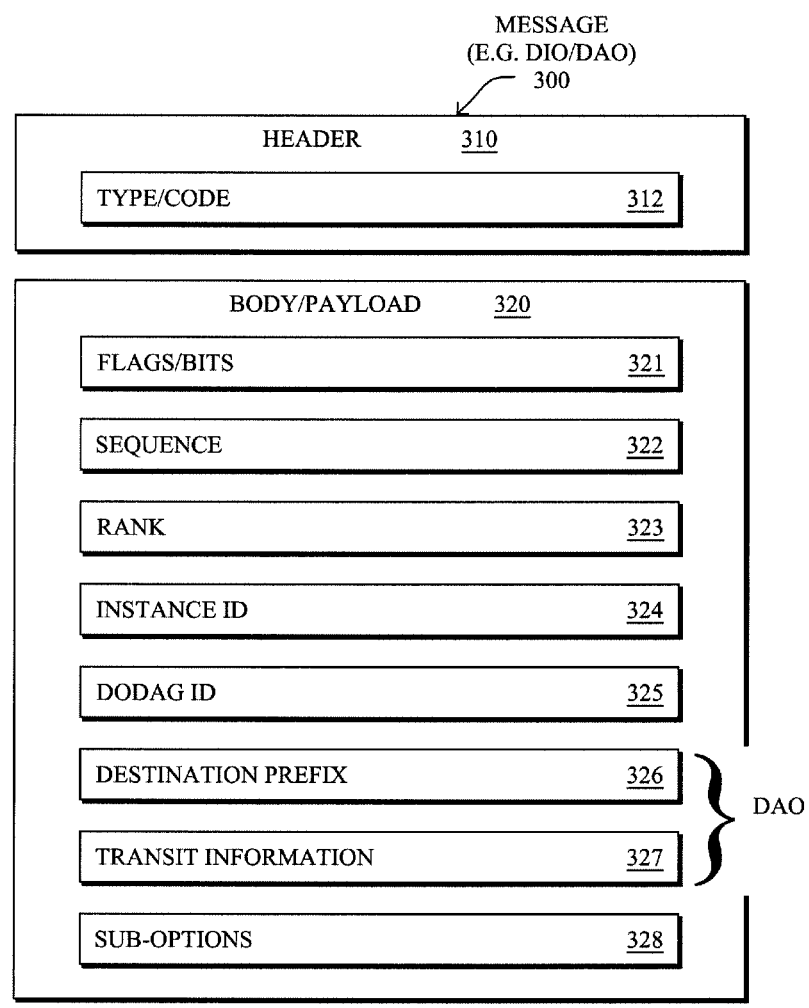
FIG. 3 illustrates an example message.

FIG. 3 illustrates an example simplified control message format 300 that may be used for discovery and route dissemination when building a DAG, e.g., as a DIO or DAO. Message 300 illustratively comprises a header 310 with one or more fields 312 that identify the type of message (e.g., a RPL control message), and a specific code indicating the specific type of message, e.g., a DIO or a DAO (or a DAG Information Solicitation). Within the body/payload 320 of the message may be a plurality of fields used to relay the pertinent information. In particular, the fields may comprise various flags/bits 321, a sequence number 322, a rank value 323, an instance ID 324, a DAG ID 325, and other fields, each as may be appreciated in more detail by those skilled in the art. Further, for DAO messages, additional fields for destination prefixes 326 and a transit information field 327 may also be included, among others (e.g., DAO_Sequence used for ACKs, etc.). For either DIOs or DAOs, one or more additional sub-option fields 328 may be used to supply additional or custom information within the message 300. For instance, an objective code point (OCP) sub-option field may be used within a DIO to carry codes specifying a particular objective function (OF) to be used for building the associated DAG. Alternatively, sub-option fields may be used to carry certain information within a message 300, as may be described herein.

As noted above, when a node wishes to join a DAG in current systems, it may do so without requiring permission from another node chosen as the entry point into the DAG, such that "child" nodes adopt their "parent" nodes without any input from the parent. Though this may not generally cause a problem, when the child node brings a heavy load with it (e.g., 1000 children of its own, or very high traffic volumes, etc.), then this autonomy can result in over-subscription and network congestion.

For example, as the RPL protocol builds its routing table, it may use a measurement which reflects the path cost of the path from each node towards the root. Once a node finds a path towards the root it may continuously monitor the quality of the path towards the root, for example, by maintaining a measurement of the ratio between packets which failed to be sent successfully and the number of packets which were sent successfully upstream towards the root. For instance, although other metrics could be used to optimize the path (e.g. latency) the ETX is a common metric used to compute the link and path reliability. The more packets a node fails to deliver upstream the higher is its ETX measurement, indicating that the path is less desired.

Figure 4A:
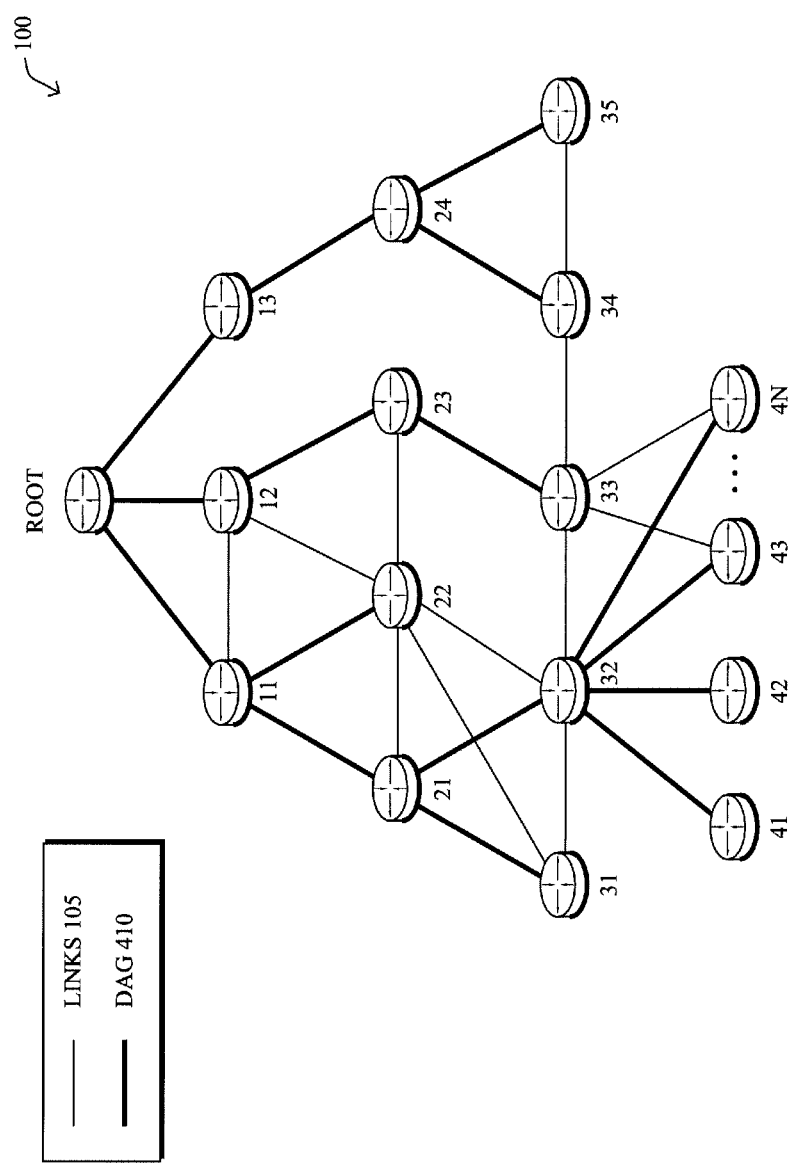
FIG. 4A illustrates an example directed acyclic graph (DAG)
Figure 4B:
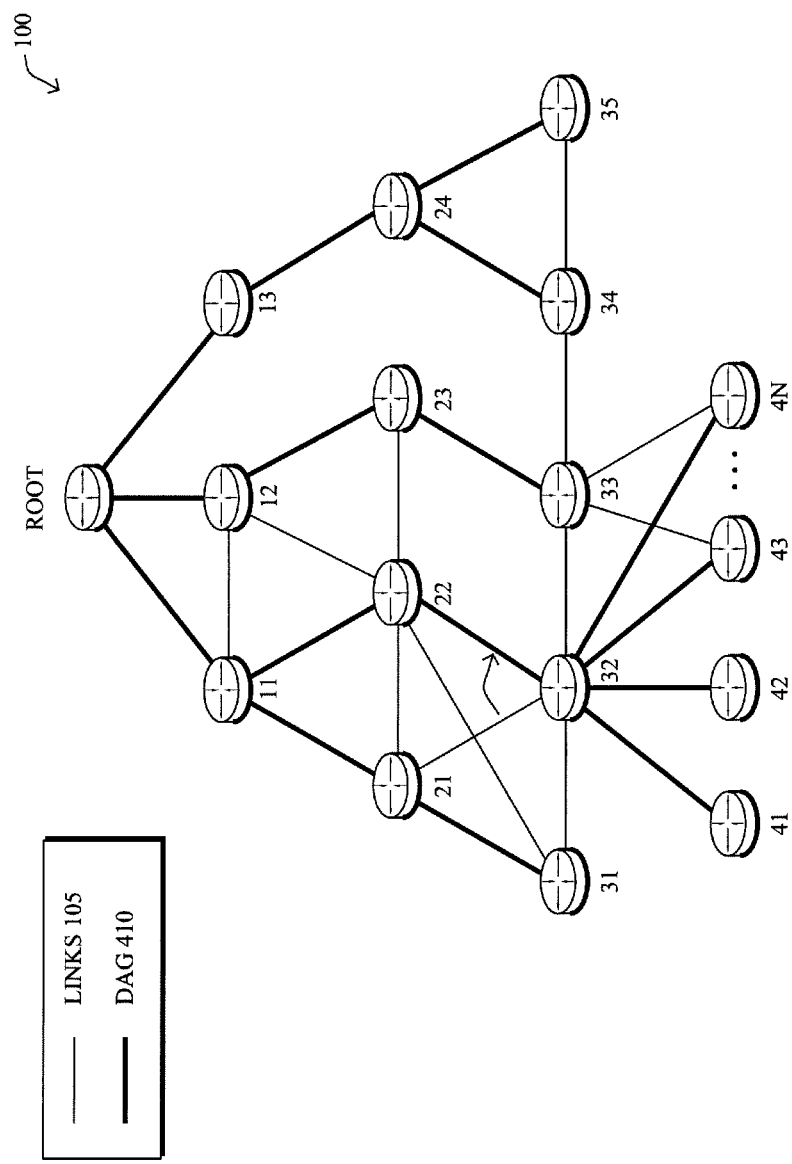
FIG. 4B illustrates another example DAG.

Assume, as shown in FIG. 4A, that a node 32, which can route its packets towards the root either via parent node 21 or 22 having path cost (quality in this example) ETXi and ETXj respectfully. Assuming that ETXi<ETXj, node 32 would select node 21 as a parent since the node 21 provides the better path quality towards the root than node 22. As shown in FIG. 4A, node 32 becomes the child of node 21 on the DAG 410, and directs its upward traffic toward its uplink through its new parent 21. After having selected node 21 as its preferred parent, node 32 will attempt to send packets (its own as well as packets from its children 41-4N) via its new parent 21, thus increasing the uplink traffic from 21 towards the root. Due to low bandwidth of the network, the number of collisions and congestion node 21 experiences may increase, thus increasing ETXi. As ETXi increases, node 32 may observe that ETXi>ETXj. After some time, then, node 32 may decide to act upon this information and optimize its route towards the root. Given that the path through 22 is now better than the path through 21, node 32 may switch parents and associates itself with node 22 for the DAG, as shown in FIG. 4B.

By switching to 22, however, node 32 directs its uplink traffic through this node, thus increasing the congestion though 22 and reducing the traffic and congestion through node 21. This new flow will therefore alter the relative ETX measurements of nodes 21 and 22, resulting in ETXi<ETXj. Accordingly, node 32 is prompted to optimize its route by associating itself with node 21 and dropping 22. This process will continue flip/flopping in this manner, resulting in periodic path rerouting and reduced network efficiency. Although the use of thresholds can help mitigate such oscillations, routing instabilities are still likely to take place.

Even in the absence of oscillations, when a node such as 32 selects node 21 without permission, this may lead to a dramatic increase of the load on some links along the path to the root crossing a certain traffic threshold (e.g., becoming congested), resulting in sub-optimal network operation.

Negotiated Parent Adoption through Load Shedding

According to one or more embodiments of the disclosure, therefore, when a node desires to join a DAG at a potential parent node, that node requests permission or negotiates the join (parent adoption), such as by informing the potential parent node of the "load" or burden associated with adding the requesting node. If the load is acceptable, then the node may join the DAG at the desired parent. If the load is unacceptable, however, then the node may be requested to "shed" some of the load, such as by removing some of its own children (child nodes of the requesting node) or directing the children to send their traffic elsewhere, as described in detail herein. Accordingly, a type of Routing Admission Control (RAC) is provided.

Illustratively, the techniques described herein may be performed by hardware, software, and/or firmware, such as in accordance with DAG process 246, which may contain computer executable instructions executed by the processor 220 to perform functions relating to the novel techniques described herein, e.g., in conjunction with routing process 244. For example, the techniques herein may be treated as extensions to conventional protocols, such as the RPL protocol, and as such, would be processed by similar components understood in the art that execute the RPL protocol, accordingly.

Operationally, the techniques herein extend the sub-options field 328 of message 300 (e.g., an additional type-length-value (TLV) in DAO messages) so each node may provide its prospective parent with a potential load/burden of adding the particular node to the DAG, e.g., based on the node itself and any of its child nodes (e.g., "grandchildren" to the prospective parent node). For example, the actual "load" may indicate various attributes, such as a number of child nodes that are already associated with the requesting node (e.g., nodes 41-4N for requesting node 32), an amount of traffic being handled by the requesting (e.g., bandwidth throughput, expected/planned traffic like reservations or based on network statistics), a frequency of traffic (e.g., the rate at which the node is expected to transmit and/or relay data), etc.

Figure 5A:
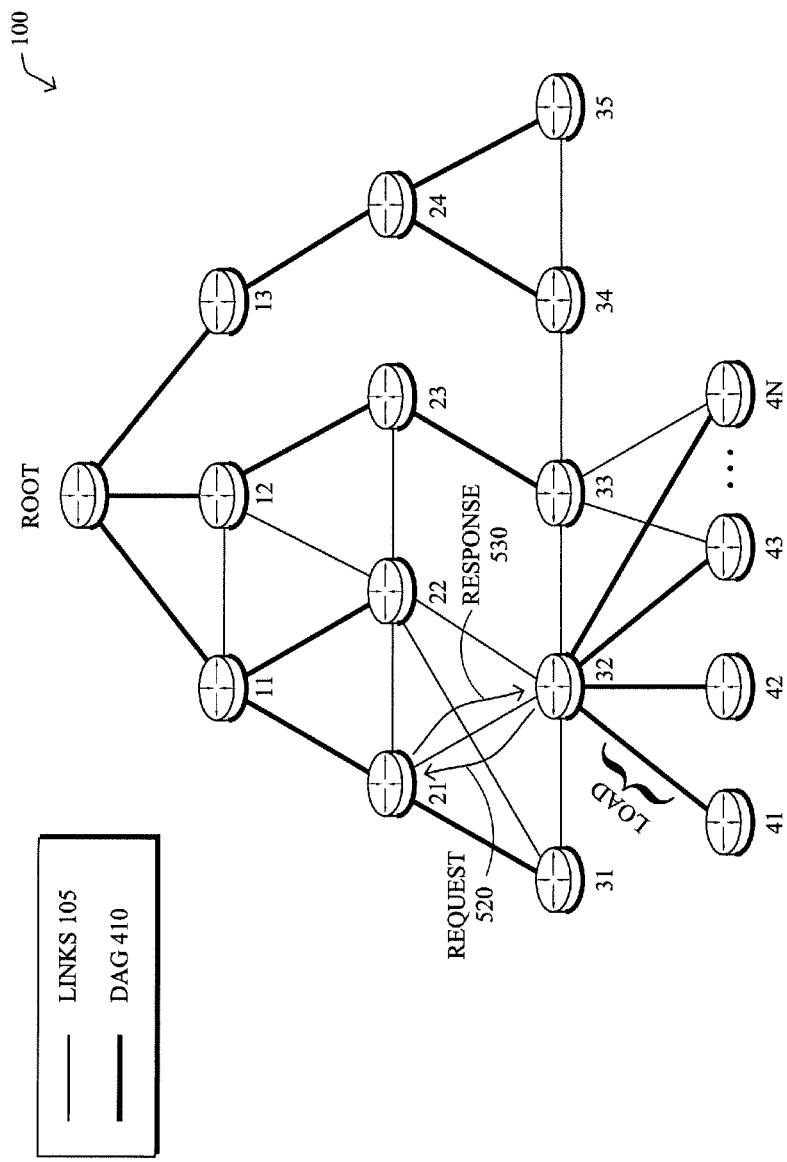
FIG. 5A illustrates an example negotiation message exchange in the network.

As shown in FIG. 5A, for example, node 32 may send a request 520 to join a prospective parent node 21 for DAG 410. Within this request is the notification of the load associated with adding the requesting node 32, as noted above. In addition, another sub-option field 328 may be used to notify the potential parent node as to whether the requesting node has any other parent node options (e.g., node 22). For instance, if there are other options, this notification may also include a quality associated with each other parent node option. In other words, each node provides its prospective parent with information whether it has other viable options or is the prospective parent the only option the requesting node has. Similarly, in accordance with a specific embodiment, a node may notify its prospective parent whether its children may have other options to shed their traffic accordingly. Also, the requesting node may provide some metrics, such as ETX, delay, etc., related to the relative quality of each prospective parent.

Note that in one or more embodiments, a node may query all of its potential parents first; at this stage it does not know (and thus does not say) if it has alternative parents. Then it could start to interrogate all nodes while indicating if it has alternatives parents. In this example, if node 22 simply rejects the request, if could interrogate node 21 indicating that it has no other alternative parent.

A potential parent node may receive the request and associated notifications, and may determine an impact associated with allowing the child node to join the particular node in the DAG based on the load. That is, a parent node receiving a request may evaluate the load it is already experiencing, such as a number of children it already has, the traffic it already has to handle, etc., as well as the impact the prospective child (and its children) may have on the overall traffic the parent would need to handle. Note that when available, the node may evaluate the impact of that new child joining not only on its local link to its own parent but upper links along the path to the DAG root. That is, the parent node may also have information about the load experienced in non-directly attached links (e.g., links along its path to the root) if metric recording is enabled. An example of metric recording for the RPL protocol is defined in the IETF Internet Draft, entitled "Routing Metrics used for Path Calculation in Low Power and Lossy Networks"<draft-ietf-roll-routing-metrics-11> by Vasseur, at al. (Oct. 23, 2010 version).

If the new traffic is under a predetermined threshold level, the new child may be accepted, and the parent node may transmit an acceptance response 530. As such, the requesting/child node may receive the acceptance response, and may join the parent node in the DAG in response.

Conversely, a denial response 530 may be transmitted to the requesting node in response to the determined impact being above the threshold level. Notably, in accordance with one or more embodiments herein, this denial need not simply reject the request from the child/requesting node (a "straight denial"), but instead the parent may counter the request by asking the child node to shed some of its load (e.g., children, traffic, etc.) before asking to be associated with the parent node. Note that such a threshold may be dynamic based on various network statistics, which may be observed in to real-time. For instance, the threshold may be based on the number of observed dropped packet due to collisions occurring higher up in the DAG (e.g., between node 11 and root node, etc.), or based on other statistics such as available bandwidth, utilized bandwidth, delay, etc. Note also that the threshold may be relayed to the requesting node in a denial, else the requesting node is left "guessing" (repeatedly requesting).

Figure 5B:
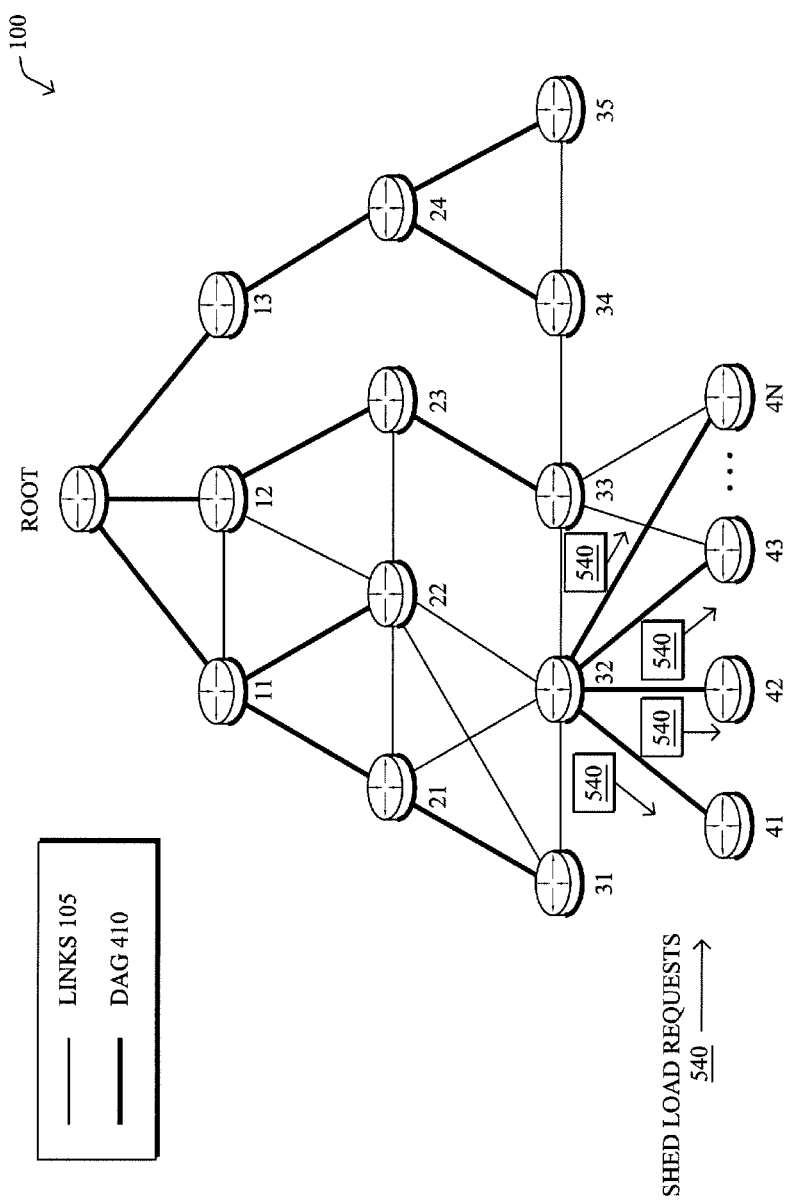
FIG. 5B illustrates an example shed load request exchange in the network.

In response to a denial 530 that has a counter request to shed load, the requesting node may examine its children and ask the children who had other options to seek association with the other prospective parent. For example, as shown in FIG. 5B, node 32 may propagate a shed load request 540 to one or more of its child nodes, such as to all child nodes (e.g., 41-4N) or only those with other parent node options (e.g., 43-4N). The shed load request 540, such as a message 300 with sub-options field 328, may request that the one or more child nodes attempt to join any other parent node option, and if unable to, then to attempt to further shed load themselves. For instance, though not shown, each of the child nodes 41-4N may also have further child nodes, and those child nodes may be asked to find alternative parents (other than nodes 41-4N), etc. Note that a level of exploration may be limited, e.g., 2-3 rank levels, before ceasing the query.

As a node sheds its load, such as its children, it can compare the updated load to the threshold learned from the prospective parent node. When a node manages to reduce its load (e.g., the number of its children per request of the prospective parent), then the node may re-issue a request (or "re-request") to the prospective parent to join the DAG, this time bringing less load (less children/traffic) to the prospective parent. Alternatively, the node may simply join the parent without issuing another request, e.g., in order to avoid additional control plane traffic (e.g., in trust mode).

Figure 5C:
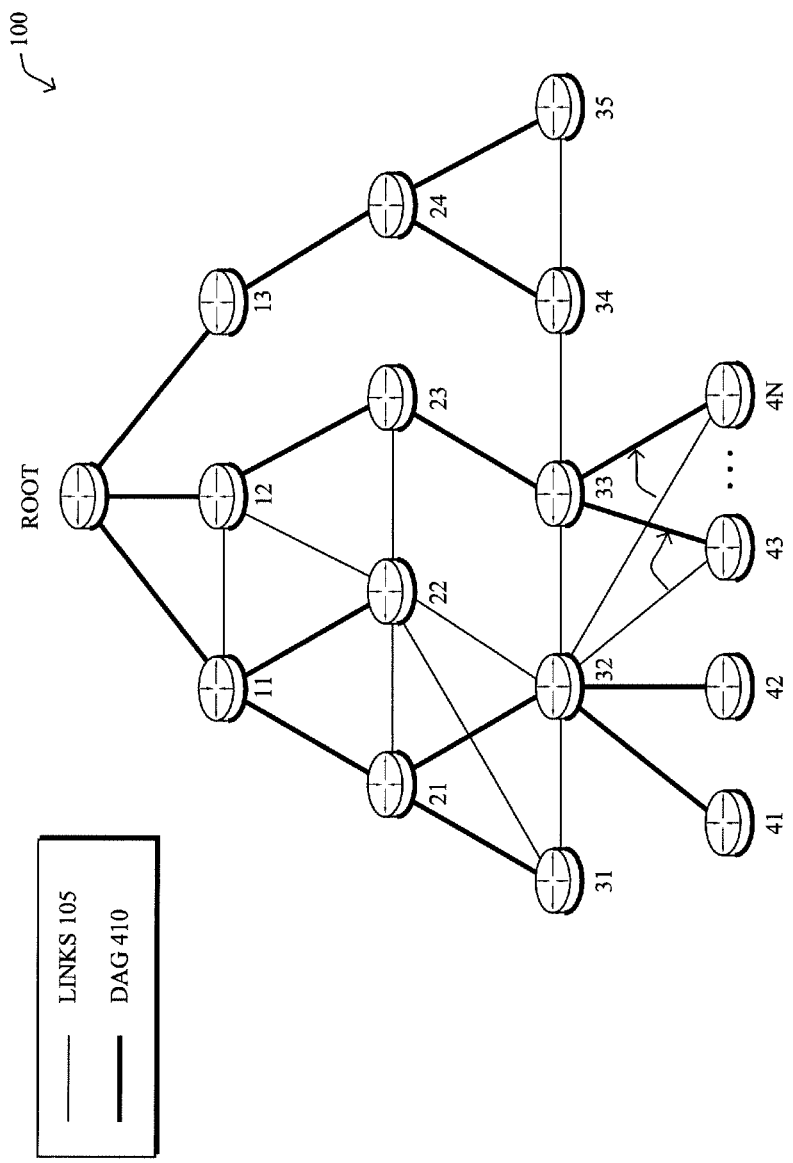
FIG. 5C illustrates an example of load shedding in the network.

For example, as shown in FIG. 5C, requesting node 32 may have shed loads corresponding to its child nodes 43-4N, which have now associated with the DAG through node 33. As such, node 32 now has a reduced load, and may request to join the DAG through parent node 21. For instance, assume that parent node 21 had previously requested that node 32 reduce its load by half. Accordingly, node 32 removed two of its four child nodes, and would thus be acceptable to the prospective parent node 21 assuming nothing substantial has changed since the last inquiry.

Note that according to one or more embodiments herein, the denial response may comprises a counter request requesting that the child/requesting node attempt to join any other parent node option, and if unable to, then to attempt to shed load. For example, where node 32 has the option to use node 22 as a parent, assuming the quality is not unacceptable, then the requesting node 32 may simply request to join the alternative parent node. In the alternative, the requesting node may first try to shed load, and then attempt to join the other parent node option, depending upon system configuration.

Figure 6A:
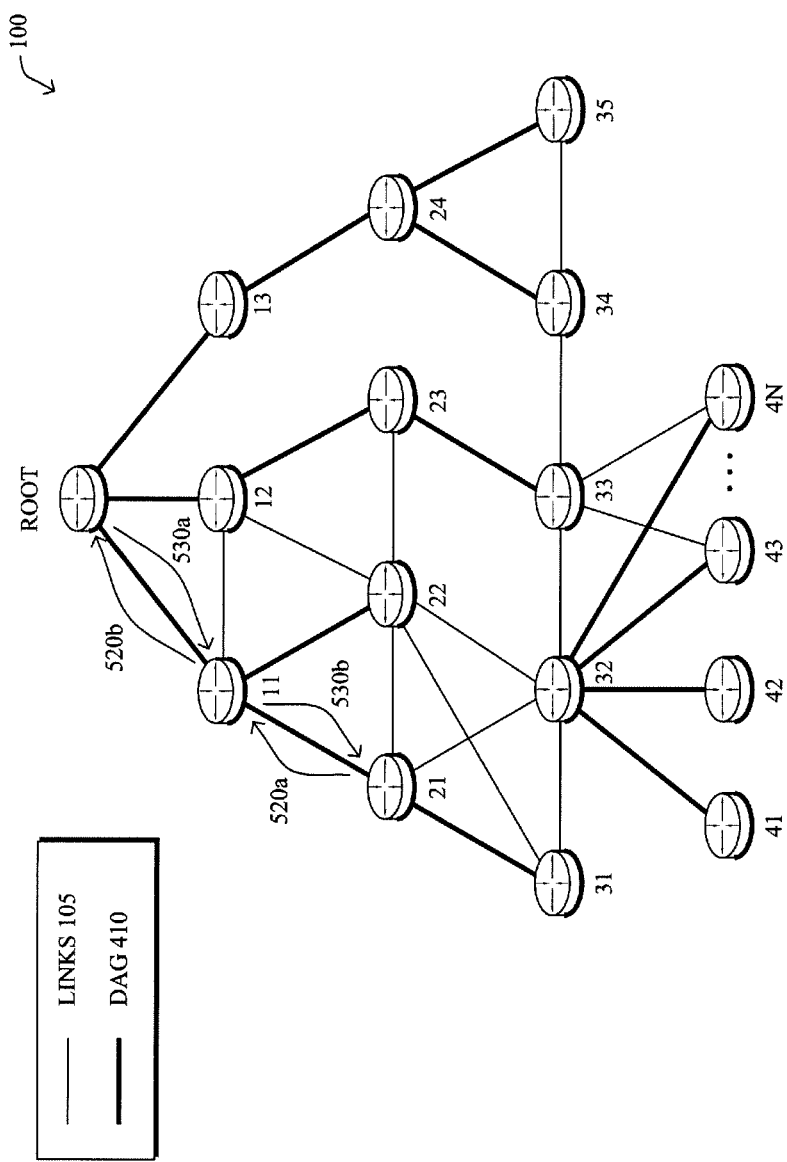
FIG. 6A illustrates an example set of negotiation message exchanges in the network.

According to one or more embodiments of the disclosure, prior to transmitting an acceptance response, a prospective parent (e.g., node 21) may first transmit its own "join request" to its own parent in the DAG 410. For instance, as shown in FIG. 6A, this join request 520a may request acceptance of a load increase based on the load of the received join request, since the addition at "lower" ranks/levels of a DAG may produce a cumulative effect the closer to the root the traffic is. As shown, this load increase request may propagate up the DAG toward the root (e.g., all the way to the root or up for a few ranks) for each node (e.g., messages 520a, 520b, etc.). Note that in this essence, the requesting node may already be joined with the parent node (e.g., node 21 to node 11), and the request to "join" the parent is in response to a load increase due to a join request received at the requesting node (e.g., at node 21 from node 32). Note that this recursive mode of operation is particularly useful if the requesting node does not have information about the load of the upper links in the DAG: in contrast, if such information is available via metric recording as specified above, this recursive request may not be needed.

If there is a problem along the way toward the root, such as where the cumulative effect is too great at any node/link in the DAG, then a denial response may be generated, potentially producing a greater number of shed load requests, or simply a straight denial. On the other hand, however, if there are no encountered problems, then acceptance responses 530 (a and b) may be returned toward the potential parent node 21, which may then inform the requesting/child node of the overall acceptance into the DAG.

Figure 6B:
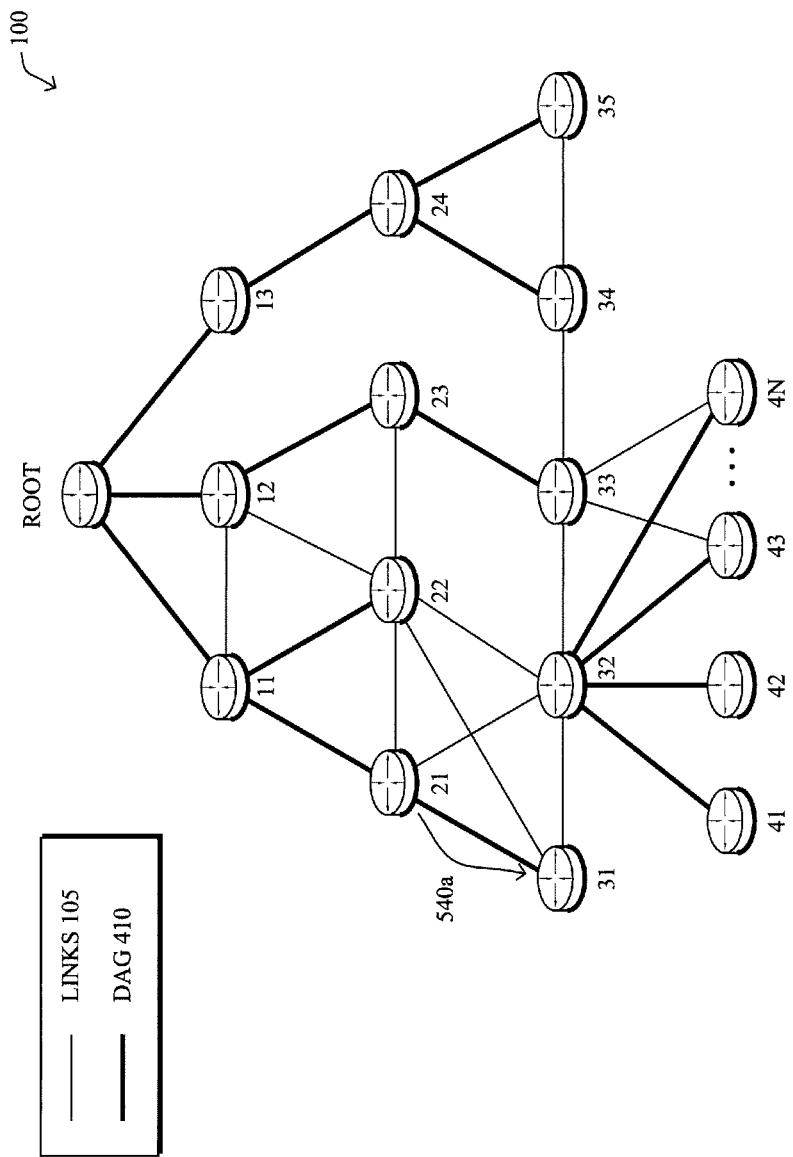
FIG. 6B illustrates another example shed load request exchange in the network.

In addition, in accordance with one or more embodiments herein, prior to transmitting a denial response to a requesting node, particularly in response to the child (requesting) node having no other parent node options, the parent node that received the request may propagate a shed load request to one or more of its own child nodes. For instance, as shown in FIG. 6B, prospective parent node 21 may send a shed load request 540a to its child node 31, requesting that the child nodes attempt to join any other parent node option, or else (e.g., if unable to), to attempt to shed some of its load (e.g., grandchildren).

Figure 6C:
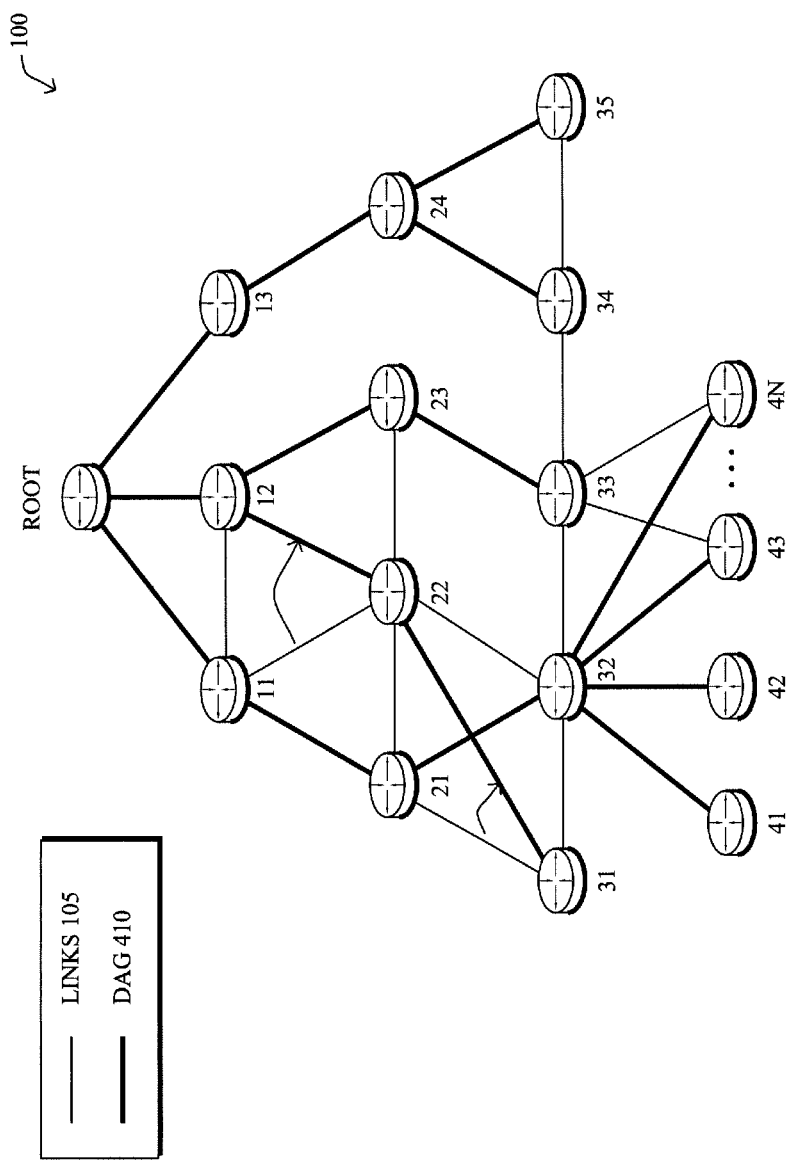
FIG. 6C illustrate another example of load shedding in the network.

As shown in FIG. 6C, in response to shedding load at the prospective parent (node 21) such that the addition of the join request load from node 32 results in an impact below the threshold, the prospective parent node 21 may transmit an acceptance response to the child node 32 to join the DAG. For example, as shown in FIG. 6C, the child node 31 of node 21 may have been able to switch parents to node 22, thus leaving room at node 21 for node 32 to join the DAG. Note also, that node 22, which was originally joined to the DAG via parent node 11, may have had to switch its own parent node (e.g., to node 12) in order to accommodate the new additional child node's load.

Figure 7:
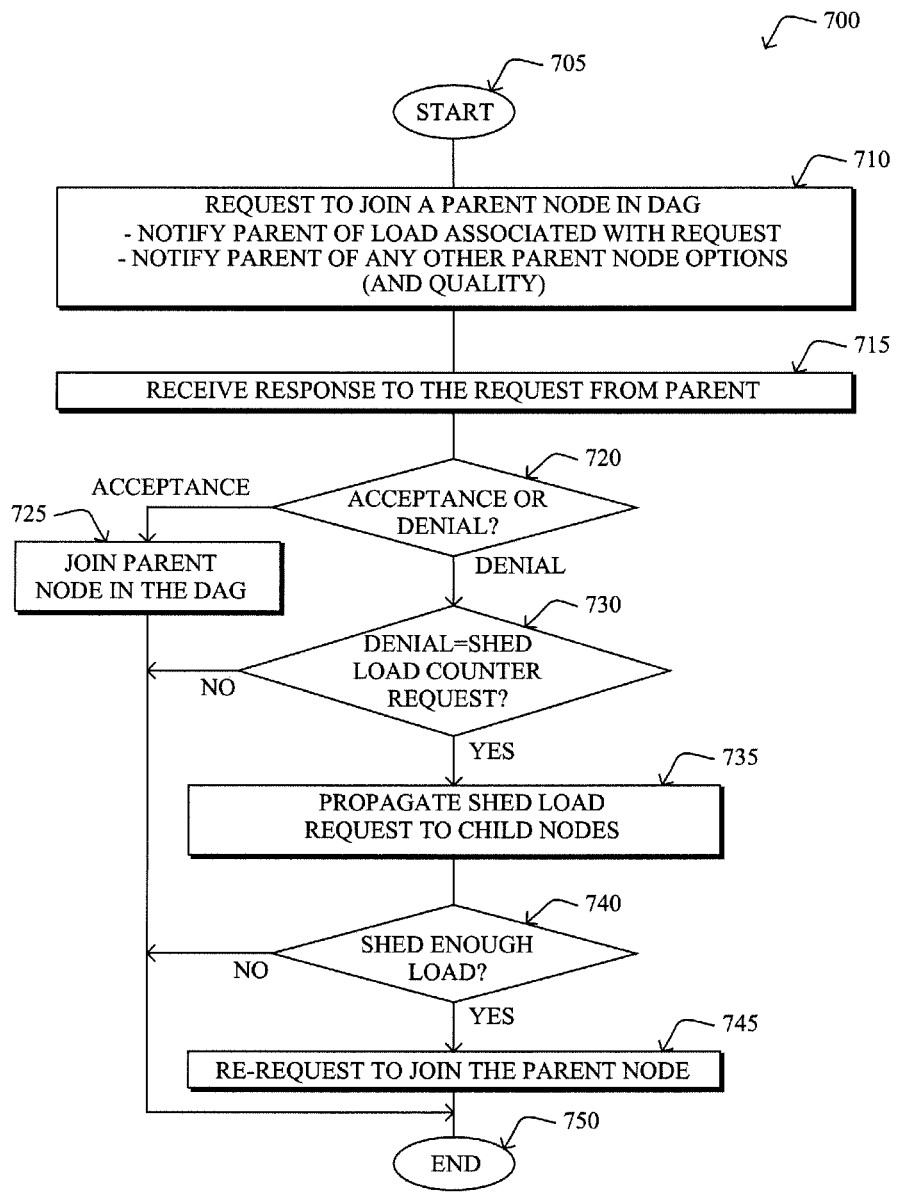
FIG. 7 illustrates an example simplified procedure for negotiated DAG joining and load shedding from the perspective of the requesting/joining node.

FIG. 7 illustrates an example simplified procedure for negotiated parent joining in accordance with one or more embodiments described herein, e.g., from the perspective of the requesting/child node. The procedure 700 starts at step 705, and continues to step 710, where a node (e.g., 32) requests to join a parent node (e.g., 21) in a DAG. As described above, the request 520 may notify the parent node of a load associated with the request, as well as whether there are any other parent node options (e.g., and their quality). In step 715, the requesting node may receive a response 530 to the request from the parent node, which is either an acceptance or denial (step 720).

If the response indicates that the join is acceptable, then in step 725, the requesting node may join the parent node in the DAG, along with its associated load. If, on the other hand, the response in step 720 is a denial, then in step 730 it can be determined by the requesting node in step 730 whether the denial message is a simple denial (i.e., where alternative parent nodes are available to the requesting node), or a counter request to shed load. If it is a counter request, then in step 735 the requesting node may propagate a shed load request 540 to one or more of its child nodes (e.g., 41-4N) to request that they find other parents, if possible, in order to reduce the overall load on the requesting node. If enough load has been shed in step 740, then in step 745 the requesting node can (optionally) re-request to join the parent node.

The procedure 700 is shown to end in step 750, however this end is based on a singular requesting node's optional parent node. For instance, if the requesting node is accepted, then after step 725 the end of the procedure results in a joining of the requesting node to the DAG. If, on the other hand, the procedure ends with a straight denial in step 730, or if the requesting node is unable to shed enough load in step 740, then the procedure ends for this first parent node, and restarts for another of the optional other parent nodes. Still further, if the requesting node has re-requested to join the parent node in step 745, then essentially the procedure restarts at step 710 for a new load value, or the prospective parent may have cached its previous answer to the original request.

Figure 8:
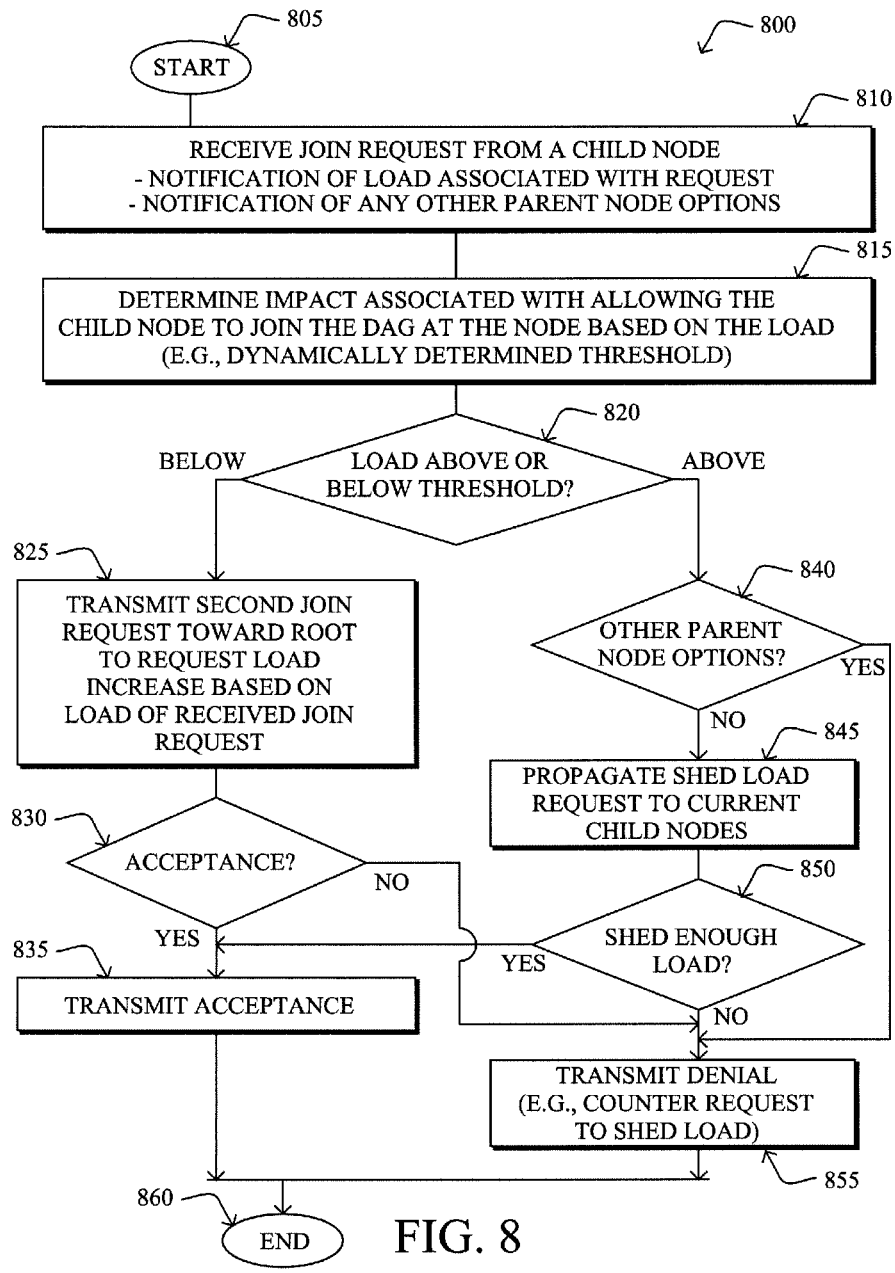
FIG. 8 illustrates an example simplified procedure for negotiated DAG joining and load shedding from the perspective of the potential parent node.

Additionally, FIG. 8 illustrates an example simplified procedure for negotiated parent joining in accordance with one or more embodiments described herein, e.g., from the perspective of the parent node. The procedure 800 starts at step 805, and continues to step 810, where a parent node (e.g., 21) receives a join request 520 from a child node (e.g., 32) along with a notification of the load and any other parent node options. In step 815, the (potential) parent node may then determine the impact associated with allowing the child node to join the DAG at the parent node based on the load. As described above, the impact threshold may be dynamically determined based on real-time traffic metrics.

If the projected load is below the threshold in step 820, then, illustratively prior to a simple acceptance, in step 825 the parent node may first transmit a second join request toward root to request a load increase based on the load of received join request, as mentioned above. Then, if that request is accepted (e.g., all the way to the root) in step 830, then in step 835 an acceptance response 530 may be returned to the requesting/child node If at step 820 the load is above the threshold, then in step 840 the parent node may determine whether any other parent node options exist for the requesting node. If not, then in step 845 the parent node may propagate its own shed load requests 540a to current child nodes to see if enough load can be shed in step 850. If enough load can be shed, then an acceptance reply may be returned to the requesting node, accordingly.

In step 855, a denial response may be sent to the requesting node, for a variety of reasons, generally when the requesting node has other optional parents. For instance, if there is not enough load shedding in step 850, or if there is no acceptance from higher-ranked parent nodes in step 830. This denial may be simply a straight denial, or a counter request to shed load, e.g., which may include threshold/load information, as noted herein. In step 860, in response to either an acceptance or a denial, the procedure ends (noting that a denial may result in receiving a new request in step 810, accordingly).

The novel techniques described herein provide for a negotiation between child and parent nodes regarding acceptance of the DAG relationship. In particular, previous techniques simply allowed any child node to join any parent node, without any say or even feedback from the parent node. However, the techniques herein provide the parent node with the authority to push back on child nodes, and request that they lighten (shed) their loads if necessary. For instance, the techniques herein perform the negotiation in advance of the relationship, and may help to prevent over-subscription in the network and to minimize metric flopping or simply poor metrics in general (e.g., congestion in the DAG), particularly before simply forming the relationships and realizing that something is broken, as in conventional systems. Also, the dynamic load shedding techniques above provide functionality that would be difficult, if not impossible, to perform manually. Notably, contrary to conventional load balancing techniques, the embodiments herein may actually change the topology of the network in response to the traffic.

While there have been shown and described illustrative embodiments that manage DAGs in a computer network, it is to be understood that various other adaptations and modifications may be made within the spirit and scope of the embodiments herein. For example, the embodiments have been shown and described herein with relation to LLNs, and more particular, to the RPL protocol. However, the embodiments in their broader sense are not so limited, and may, in fact, be used with other types of networks and/or protocols utilizing DAG routing (e.g., distance vector protocols). Also, while the techniques described above reference shedding load, these concepts may also be used in conjunction with load partitioning, such as dividing child nodes of a requesting node into separate groups, and having the requesting node join multiple parents, e.g., one for each group, in order to reduce the load of the requesting node to an acceptable level per parent (e.g., as found in the related application noted above). For example, certain loads may be shed, while certain loads may be partitioned.

The foregoing description has been directed to specific embodiments. It will be apparent, however, that other variations and modifications may be made to the described embodiments, with the attainment of some or all of their advantages. For instance, it is expressly contemplated that the components and/or elements described herein can be implemented as software being stored on a tangible (non-transitory) computer-readable medium (e.g., disks/CDs/etc.) having program instructions executing on a computer, hardware, firmware, or a combination thereof. Accordingly this description is to be taken only by way of example and not to otherwise limit the scope of the embodiments herein. Therefore, it is the object of the appended claims to cover all such variations and modifications as come within the true spirit and scope of the embodiments herein.

What is claimed is:

1. A method, comprising:
   requesting, by a particular node, to join a parent node in a directed acyclic graph (DAG) in a computer network;
   notifying the parent node of a load associated with the request;
   notifying the parent node as to whether the particular node has any other parent node options;
   receiving a response to the request from the parent node, the response being one of either an acceptance or a denial; and
   in response to a response indicating an acceptance, joining the parent node in the DAG.

2. The method as in claim 1, wherein the denial comprises a counter request to shed load, the method further comprising:
   propagating a shed load request to one or more child nodes of the particular node, the shed load request requesting that the one or more child nodes attempt to join any other parent node option, and if unable to, then to attempt to shed load; and
   in response to shedding load according to the counter request, re-requesting to join the parent node.

3. The method as in claim 1, wherein load is selected from at least one attribute selected from a group consisting of: a number of child nodes; an amount of traffic; a frequency of traffic; and an amount of planned traffic.

4. The method as in claim 1, further comprising:
   in response to notifying the parent node of at least one other parent node option, notifying the parent node of a quality associated with the at least one other parent node option.

5. The method as in claim 1, wherein the particular node has already joined the parent node in the DAG, and wherein the request to join the parent node is in response to a load increase due to a join request received at the particular node.

6. An apparatus, comprising:
   one or more network interfaces;
   a processor coupled to the network interfaces and adapted to execute one or more processes; and
   a memory configured to store a process executable by the processor, the process when executed operable to:
     request to join a parent node in a directed acyclic graph (DAG) in a computer network;
     notify the parent node of a load associated with the request;
     notify the parent node as to whether the apparatus has any other parent node options;
     receive a response to the request from the parent node, the response being one of either an acceptance or a denial; and
     join the parent node in the DAG in response to an acceptance.

7. The apparatus as in claim 6, wherein the denial comprises a counter request to shed load, the process when executed further operable to:
   propagate a shed load request to one or more child nodes of the apparatus, the shed load request requesting that the one or more child nodes attempt to join any other parent node option, and if unable to, then to attempt to shed load; and in response to shedding load according to the counter request, re-request to join the parent node.

8. The apparatus as in claim 6, wherein load is selected from at least one attribute selected from a group consisting of: a number of child nodes; an amount of traffic; a frequency of traffic; and an amount of planned traffic.

9. The apparatus as in claim 6, wherein the process when executed is further operable to:

in response to notifying the parent node of at least one other parent node option, notify the parent node of a quality associated with the at least one other parent node option.

10. The apparatus as in claim 6, wherein the apparatus has already joined the parent node in the DAG, and wherein the request to join the parent node is in response to a load increase due to a join request received at the particular node.

11. A method, comprising:

receiving, by a particular node in a directed acyclic graph (DAG) in a computer network, a join request from a child node;

receiving, from the child node, notification of a load associated with the request and whether the child node has any other parent node options;

determining an impact associated with allowing the child node to join the particular node in the DAG based on the load;

transmitting an acceptance response to the request in response to the determined impact being below a threshold level; and transmitting a denial response to the request in response to the determined impact being above the threshold level.

12. The method as in claim 11, wherein the denial response comprises a counter request requesting that the child node attempt to join any other parent node option, and if unable to, then to attempt to shed load.

13. The method as in claim 11, further comprising:

determining the threshold level dynamically in response to network statistics.

14. The method as in claim 11, further comprising:

prior to transmitting an acceptance response, transmitting a second join request to a parent node of the particular node in the DAG, the second join request requesting a load increase based on the load of the received join request at the particular node.

15. The method as in claim 11, further comprising, prior to transmitting a denial response in response to the child node having no other parent node options:

propagating a shed load request to one or more child nodes of the particular node, the shed load request requesting that the one or more child nodes attempt to join any other parent node option, and if unable to, then to attempt to shed load; and in response to shedding load such that the addition of the join request load results in an impact below the threshold, transmitting an acceptance response to the child node.

16. The method as in claim 11, wherein load is selected from at least one attribute selected from a group consisting of: a number of child nodes; an amount of traffic; a frequency of traffic; and an amount of planned traffic.

17. An apparatus, comprising:

one or more network interfaces configured to communicate in a directed acyclic graph (DAG) in a computer network;

a processor coupled to the network interfaces and adapted to execute one or more processes; and a memory configured to store a process executable by the processor, the process when executed operable to:

receive a join request from a child node;

receive, from the child node, notification of a load associated with the request and whether the child node has any other parent node options;

determine an impact associated with allowing the child node to join the apparatus in the DAG based on the load;

transmit an acceptance response to the request in response to the determined impact being below a threshold level; and transmit a denial response to the request in response to the determined impact being above the threshold level.

18. The apparatus as in claim 17, wherein the denial response comprises a counter request requesting that the child node attempt to join any other parent node option, and if unable to, then to attempt to shed load.

19. The apparatus as in claim 17, wherein the process when executed is further operable to:

determine the threshold level dynamically in response to network statistics.

20. The apparatus as in claim 17, wherein the process when executed is further operable to:

prior to transmitting an acceptance response, transmit a second join request to a parent node of the apparatus in the DAG, the second join request requesting a load increase based on the load of the received join request at the apparatus.

21. The apparatus as in claim 17, wherein the process when executed is further operable to, prior to transmission of a denial response in response to the child node having no other parent node options:

propagate a shed load request to one or more child nodes of the apparatus, the shed load request requesting that the one or more child nodes attempt to join any other parent node option, and if unable to, then to attempt to shed load; and in response to shedding load such that the addition of the join request load results in an impact below the threshold, transmit an acceptance response to the child node.

22. The apparatus as in claim 17, wherein load is selected from at least one attribute selected from a group consisting of: a number of child nodes; an amount of traffic; a frequency of traffic; and an amount of planned traffic.

\* \* \* \* \*